(12) United States Patent
Green et al.

(10) Patent No.: US 9,795,888 B2
(45) Date of Patent: Oct. 24, 2017

(54) GAMIFICATION AND COMPUTERIZATION OF ON-LINE PHOTO IDENTIFICATION

(71) Applicants: Howard A. Green, Palm Beach, FL (US); Joseph Gene Cannata, Jr., Cary, NC (US)

(72) Inventors: Howard A. Green, Palm Beach, FL (US); Joseph Gene Cannata, Jr., Cary, NC (US)

( * ) Notice: Subject to any disclaimer, the term of this patent is extended or adjusted under 35 U.S.C. 154(b) by 343 days.

(21) Appl. No.: 14/311,229

(22) Filed: Jun. 20, 2014

(65) Prior Publication Data

US 2015/0148115 A1 May 28, 2015

Related U.S. Application Data

(60) Provisional application No. 61/908,725, filed on Nov. 25, 2013.

(51) Int. Cl.
| | |
|---|---|
| *A63F 13/10* | (2006.01) |
| *A63F 9/24* | (2006.01) |
| *A63F 13/80* | (2014.01) |
| *A63F 13/655* | (2014.01) |

(52) U.S. Cl.
CPC ............ *A63F 13/80* (2014.09); *A63F 13/655* (2014.09)

(58) Field of Classification Search
USPC .............................................................. 463/9
See application file for complete search history.

(56) References Cited

U.S. PATENT DOCUMENTS

| | | | | |
|---|---|---|---|---|
| 8,533,608 | B1 * | 9/2013 | Tantiprasut | G06Q 10/06 715/751 |
| 8,548,828 | B1 * | 10/2013 | Longmire | G06Q 10/10 705/3 |
| 2007/0130538 | A1 * | 6/2007 | Chiu | G06F 17/3089 715/792 |
| 2011/0307304 | A1 * | 12/2011 | Mercuri | G06Q 10/101 705/12 |
| 2012/0209621 | A1 * | 8/2012 | Green | G06Q 10/00 705/2 |
| 2013/0029745 | A1 * | 1/2013 | Kelly | G07F 17/32 463/19 |
| 2013/0166340 | A1 * | 6/2013 | Salame | G06Q 30/08 705/7.14 |

* cited by examiner

*Primary Examiner* — Pierre E Elisca
(74) *Attorney, Agent, or Firm* — Oltman, Flynn & Kubler

(57) ABSTRACT

A computerized on-line photo identification game presented through a computer program provides a subject matter category and steps for registration of website visitors to become photo-submitting players or to become photo subject matter identifying photo identifying players who receive photos of specific subject matter within the subject matter category submitted by photo-submitting players and identify the subject matter shown in the photos by name, by matching the subject matter to stored text in the program database, or both, and in which the photo identifying players may be rated by factors including concurrence with the majority of photo identifying players in identification and in which they may also be rewarded.

81 Claims, 5 Drawing Sheets

Quality Control and Rewards

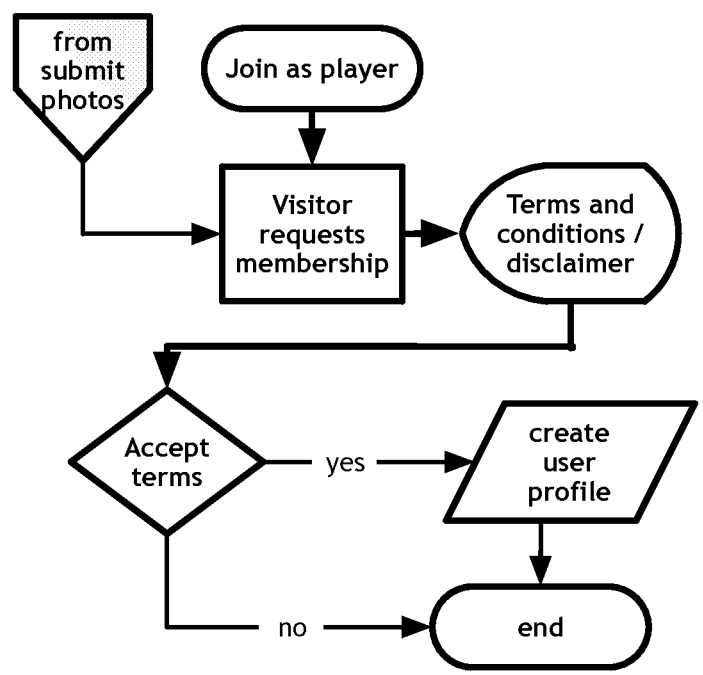
Figure 1: Become Player

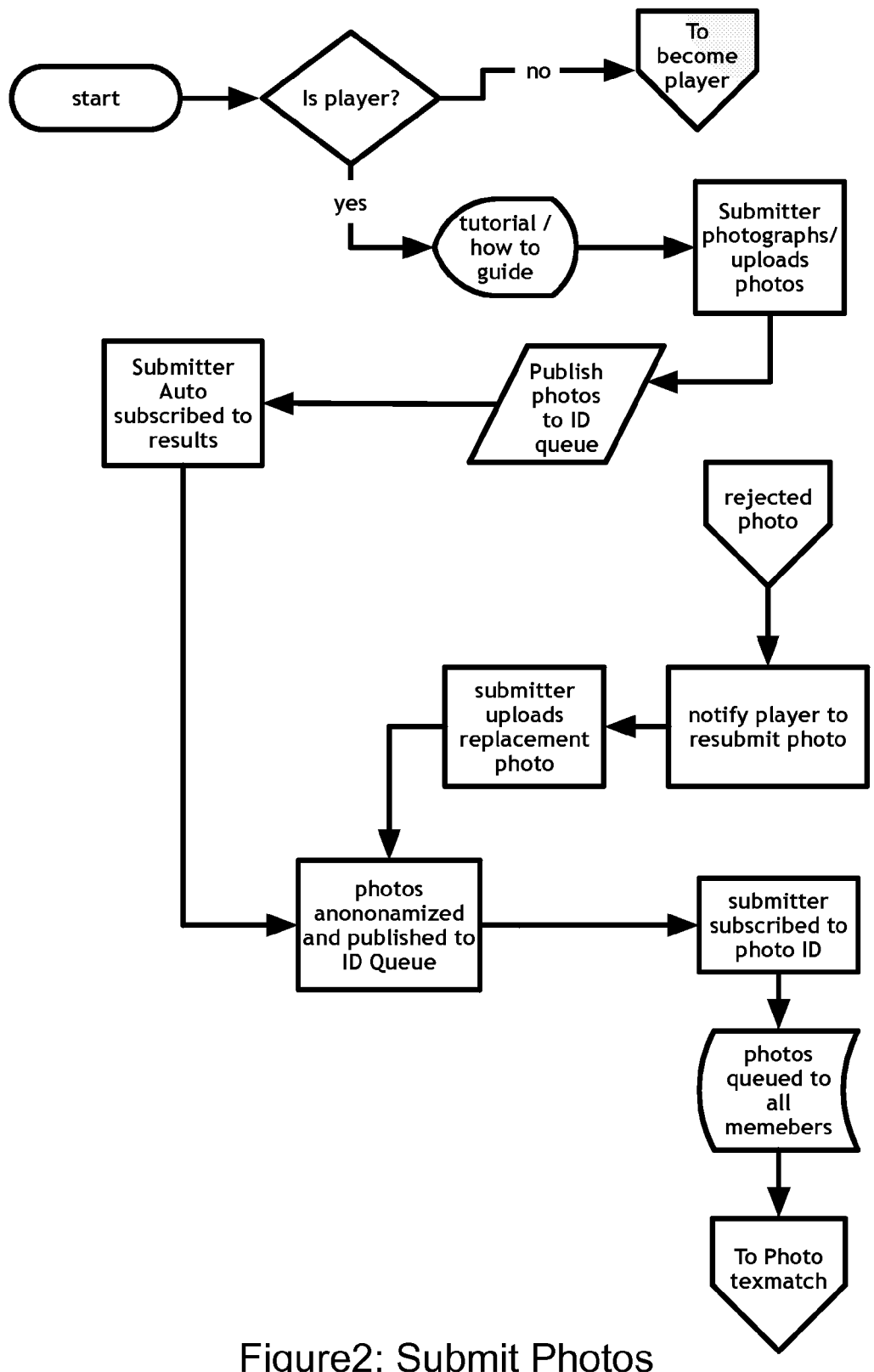
Figure2: Submit Photos

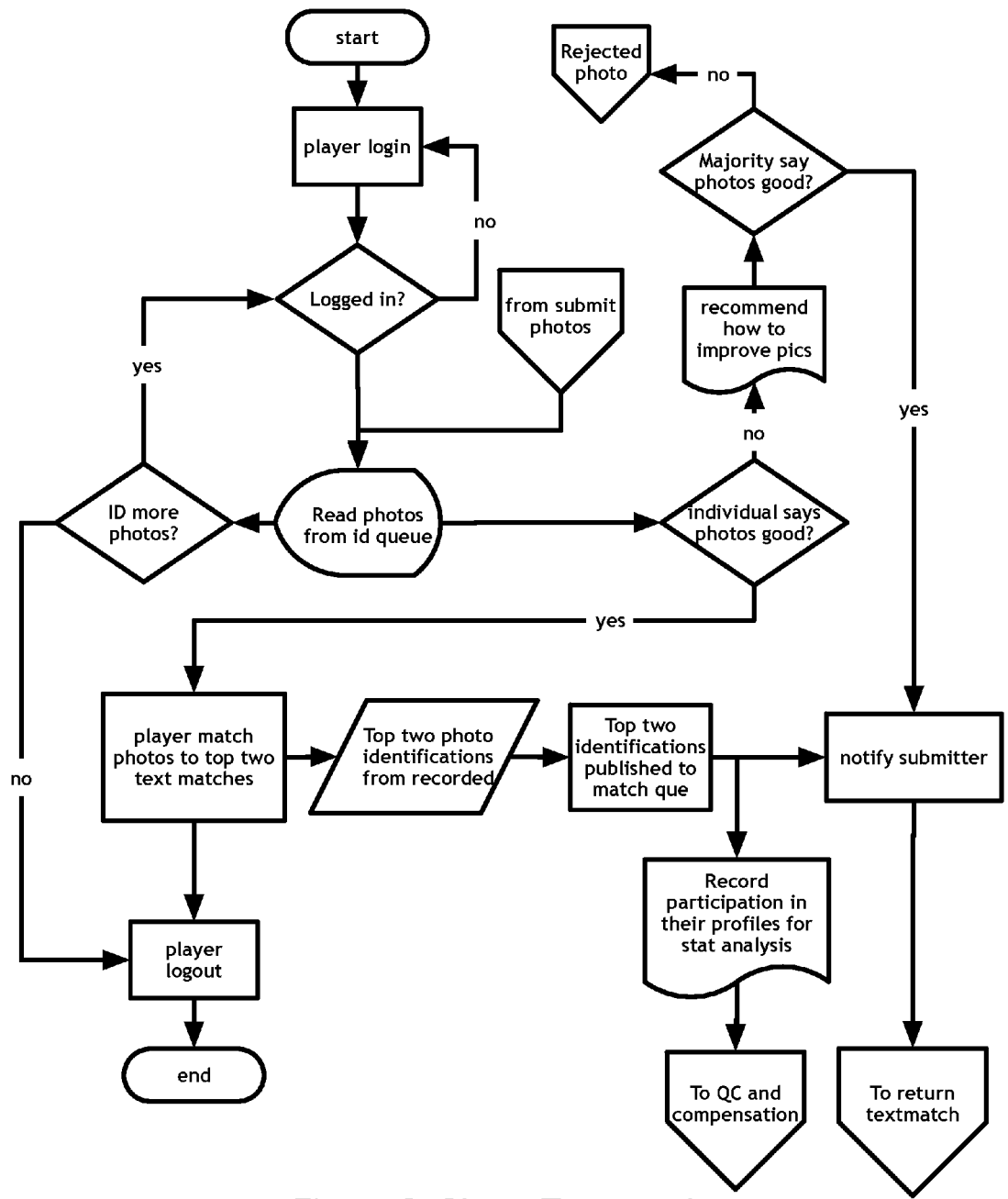
Figure 3: Photo Textmatch

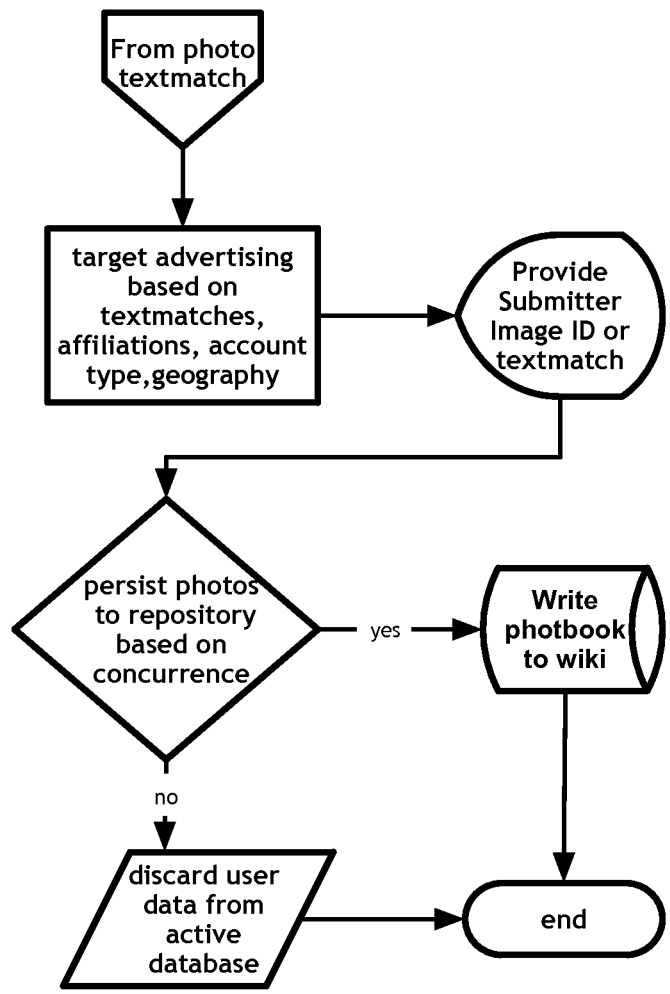
Figure4: Return Textmatch

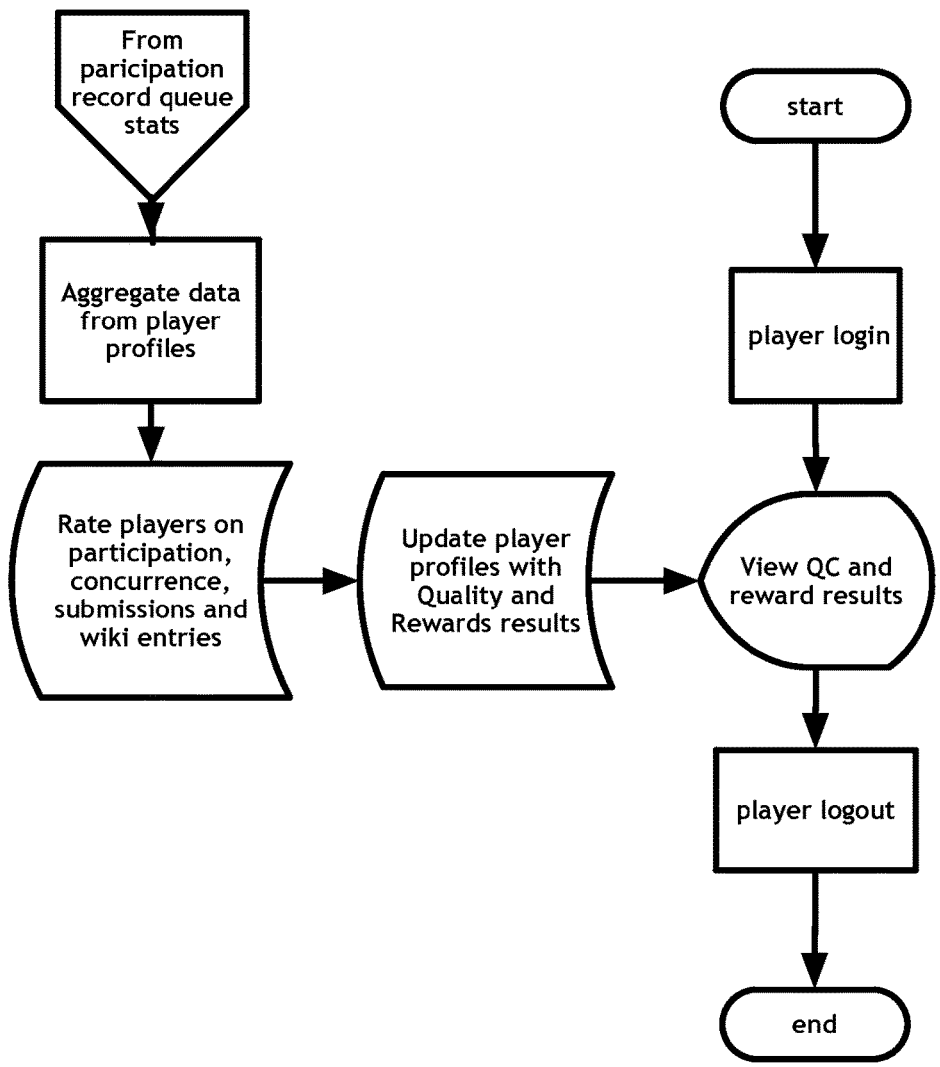
Figure 5: Quality Control and Rewards

“GAMIFICATION AND COMPUTERIZATION OF ON-LINE PHOTO IDENTIFICATION”

FILING HISTORY

This application continues from provisional patent application Ser. No. 61/908,725 filed on Nov. 25, 2013.

BACKGROUND OF THE INVENTION

1. Field of the Invention

The present invention relates generally to the field of computerized on-line games. More specifically the present invention relates to an on-line photo identification game for game participants including photo submitting participants and photo identification participants. The subject shown in the photo is considered within a subject matter category, such as a type of bird or plant is in the photo, a city, a street, a building, a river or a mountain range anywhere in the world or a region of the world, an astronomical object, a heavenly body or a phenomenon, an agricultural disease in a crop, an insect or an animal, a dental condition of the oral cavity, a condition a type of historical a artifact, a antique or a fossil, or a postage stamp, a work of art, or a collectable coin. The game operates on the principle that collective intelligence, such as that provided by several photo identification participants, will most likely provide a highly reliable photo identification. The identification is in most instances simply a name of what is in the photo, but in some instances may be a fuller description of what is in the photo, as long as the description lends itself to ready comparison with other submitted photo identifications so that the concurrence with other photo identification participants can be determined readily such as by the website program. The identification may be in the form of or be supplemented by a stored text matched to the photo, referred to in this application as a textmatch. Where the photo is of part of a human body appearing to show a condition, the identification of what is in the photo is not a medical diagnosis, because the identification at most might be of one or more symptoms in the photo which may in the judgment of a doctor relate to any of a variety of different conditions. Therefore this remains an identification game, and never represents or substitutes for the judgment of a doctor in relation to a given patient and as a result does not constitute the practice of medicine.

The game includes the method steps of creating a website for the on-line game having a website program; receiving photos from on-line submitting participants relating to a certain topic or subject matter; the website copying the photos to on-line photo identification participants for identification; each photo identification participant submitting through the website his or her best evaluation and resulting identification of what is shown in the photo; the website determining the most common identification and optionally in addition determining the second most common identification of what is in the photo from the identifications submitted by the participating photo evaluation participants; and the website sending to the submitting participant of the given photo the most common and optionally in addition the second most common photo content identification. Game participants, particularly photo identification participants, may be required to be professionals in a given field who are credentialed by the website for game participation, or may be anyone believing they have knowledge of the given field or who simply wish to participate.

Another step is storing the photo and its identification(s) in a photo and text website database which for example may be called a wikiphotoatlas for future reference for educational and other uses. Further additional steps include matching explanatory text to the most or second most submitted identification for the given photo, the text preferably being drawn from the website database, and sending this matched text to the photo submitting participant who supplied the given photo to further educate him or her about what is in their photo.

These steps, in themselves, define the essence of the present game. While the steps which follow add the element of competition, but according to WIKIPEDIA™, the present method defines a game with or without them:

"Key components of games are goals, rules, challenge and interaction. Games generally involve mental or physical stimulation, and often both. Many games help develop practical skill . . . or otherwise perform an educational, simulational or psychological role."

The submitting participants and the photo identification participants may be the same people, and all participants receive points for their participation so that a winner can be determined or compensation can be awarded, or both. Points may be granted for submitting a photo for identification, for participating in a photo identification and for submitting an identification of a photo that the website determines is among the most common for the given and optionally receiving points for submitting an identification of a photo that the website determines is among the second most common for the given photo, since concurrence with a majority is considered an indication of a correct or well considered identification. Points may also be granted for editing text stored in the photo and text data base.

2. Description of the Prior Art

What has been missing in the art is an expertly guided information service via the Internet for the Internet and global community.

It is thus an object of the present invention to provide a website and website program in which a photo identification game can be played, one example of which involves a computer program in which one or more photos and information are conveyed to several experts selected through either testing their of knowledge of the subject matter category of the game or through credentialing as professionals who have registered and become photo identifying players from a customer who has provided the photo(s) taken by either him or herself or another person for the purpose of seeking information about the subject matter depicted in the photo(s), and thus is the first expertly or professionally guided search engine using collective or group intelligence.

It is another object of the present invention to provide such a computer program in which the identification of the image shown in the photo may consist of simply providing a name for the subject matter shown in the photo, or matching the subject matter shown in the photo with explanatory text, or both.

It is still another object of the present invention to provide such a computer program in which the exchange of information is not in any way limited by the ability of the lay person or customer to recognize, describe and match the subject of his or her photo with that of a website image or description.

It is yet another object of the present invention to provide such a computer program which encompasses most if not all published information about a subject matter category.

It is a still further object of the present invention to facilitate discussion for the open exchange of information and to promote education and academics.

It is a yet further object of the present invention to provide such a computer program which allows for the publication of a real time wiki atlas using the photographs identified by the group of photo identifying players and pertinent text written by the group of photo identifying players.

It is finally an object of the present invention to provide such a computer program which is easy to use and of maximum reliability via several different electronic media portals.

SUMMARY OF THE INVENTION

The present invention accomplishes the above-stated objectives, as well as others, as may be determined by a fair reading and interpretation of the entire specification.

A method is provided, which is executed by a computer program, of generating information through interaction among several photo identifying players and with a customer who has provided at least one photo, including the steps of: a service providing the computer program; one of a customer and the service providing a subject matter category; providing a plurality of photo identifying players who have been selected through either testing or credentialing and registering to become photo identifying players; the customer accessing the program on a computer; the customer becoming a player to gain access to the program and automatically being subscribed to a textmatch queue; the customer generating at least one photo of a subject within the subject matter category; the customer uploading to the program the at least one photo as a collection to a photo queue; the customer entering information relating to at least one photo and related information from the customer; the program making the collection anonymous; the program making the collection available for viewing in the photo queue; the several photo identifying players each retrieving the collection from the photo queue; the several photo identifying players viewing the collection and identifying what is shown in the photo; the several photo identifying players each matching the at least one photo to two preferred names and associated texts stored in the program identifying and describing what is shown in the at least one photo in the collection; the program determining the two leading text matches selected most frequently by the several photo identifying players for the collection; the program updating the collection with the two leading matched texts most selected by the several photo identifying players and publishing it to the textmatch queue; the program notifying the customer that the match is complete and the updated collection with matched texts is available; and the customer accessing the program and displaying the updated collection and matched texts from the textmatch queue.

BRIEF DESCRIPTION OF THE DRAWINGS

Various other objects, advantages, and features of the invention will become apparent to those skilled in the art from the following discussion taken in conjunction with the following drawings, in which:

FIG. 1 is an exemplary flow chart of the customer interaction with the portion of the present program in which the website visitor registers to become a player.

FIG. 2 is an exemplary flow chart of the player interaction with the portion of the present program in which a player submits a photo.

FIG. 3 is an exemplary flow chart in which the submitted photo referenced in FIG. 2 is matched by photo identifying players with descriptive text in what is referred to as a textmatch.

FIG. 4 is an exemplary flow chart in which the textmatch is returned to the player together with target advertising and an opportunity is created for nonprofessional players.

FIG. 5 is an exemplary flow chart reflecting method steps in providing quality control and rewards.

DETAILED DESCRIPTION OF THE PREFERRED EMBODIMENTS

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

Preferred Method

Referring to FIGS. 1-5, a method is disclosed of providing information executed by a computer program interacting with at least one and preferably several experts in a given subject matter, referred to herein simply as photo identifying players, and with a customer who has provided the photographic image (hereinafter photo), digital image or picture of a subject within a selected subject matter category to identify the subject shown in the photo. For this embodiment, customers are for the most part considered to be lay customers or players of the general public.

The photo identifying players are the provided through the steps of accepting applications from prospective photo identifying players; and one of administering a test of the subject matter of the game to the prospective photo identifying players and accepting those who pass and evaluating credentials of prospective photo identifying players to determine whether they have sufficient expertise in the subject matter of the game, and the accepted prospective photo identifying players registering.

The method includes the essential steps of: the customer accessing the program on a computer; the customer becoming a player of text match service to gain further access to the program; the customer automatically being subscribed to a queue henceforth known as the textmatch queue; the customer generating or acquiring at least one photo of a subject within a selected subject matter category; the customer entering an identification of the subject shown in the photo was taken; the customer uploading to the program the photo(s); the program assembling the photo(s) into a collection known henceforth as a photobook; the program publishing the photobook to the photo queue; the program assigning a unique identifier to the photobook, the program making the photobook anonymous by secreting the unique identifier which connects the photobook to the customer; the program making the photobook readable on the photo queue; participating photo identifying players subscribed to the photo queue retrieving the photobook from the queue; several members of the photo identifying player group viewing the photobook and identifying what is shown in the photo(s); the participating photo identifying players matching the photobook to stored texts identifying or describing the identified subject photo; the program storing all matches associated to the photobook; the program determining the two leading text matches or names of what is shown in the photo as selected most frequently by the photo identifying players; the program publishing the photobook in combination with the two leading matched texts to the textmatch queue; the program notifying the customer that the match is complete via one of: app notification badge, account notification badge on the program driven website, cell phone text, short message service, apple imessage, email, postal mail and telefax; customer viewing the identifications and textmatches associated to their photobook from the textmatch queue; the program conveying photobooks to a wiki based atlas for the continuing education of professional and lay users of the service as well as for potential research; the program calculating photo identifying player standings based on concurrence with the majority; the program identifying top rated experts in multiple categories to be rewarded for participation and concurrence with the majority.

Becoming a Player

Referring to FIG. 1, the basic method, including additional preferred steps, is as follows: a website visitor accessing the program; the visitor requesting to be accepted as a player; the program displaying user terms and conditions and a disclaimer; the visitor entering a decision of whether he or she accepts the terms and conditions and disclaimer; if the visitor rejects the terms and conditions and disclaimer, the program rejecting the visitor and ending his or her use of the program; if the visitor accepts the terms and conditions and disclaimer, the program displaying a notice of privacy practices (npp); the visitor entering a decision of whether he or she accepts the notice of privacy practices; if the visitor rejects the notice of privacy practices, the program rejecting the visitor and ending his or her use of the program; if the visitor accepts the notice of privacy practices, the program prompting the visitor to indicate whether he or she is a professional or a customer; the program creating a customer profile; the program automatically subscribing the customer to the textmatch queue; the program prompting the visitor to indicate whether he or she wishes to become a photo identifying player; where the visitor indicates a desire to become a photo identifying player, the visitor indicating whether he or she has expertise in the subject matter of the game or is a credentialed "professional" in the subject matter; the program prompting the visitor to one of take a test of his or her knowledge of the subject matter and the computer determining whether the visitor passes the test, and the alternative of the visitor enter his or her professional credentials and the program verifying the credentials to either accept or reject the credentials; if the program determines that the visitor failed the test or if the program rejects the credentials, the program rejecting the applicant and ending his or her use of the program; if the program determines that the visitor passed the test or the program accepts the credentials, the program automatically subscribing the professional to the textmatch queue; the program prompting the professional to either submit a photo only or become a photo identifying player; if the visitor indicates his or her decision to submit a photo only, the program creating a player submission profile. The test administered by the program to visitors who indicate a desire to become photo identifying players to determine whether they will be accepted preferably is a competency test based on control set of photos of selected subject matter categories which the professional must identify; if the professional passes the competency test, the program creating a photo identifying player profile allowing participation in the photo ID process as a photo identifying player.

Submitting Photos

Referring to FIG. 2, a person accessing the program; the program prompting the person to submit identifying information to determine whether the person is a player; if the program determines that the person is not a player, the program directing the person to the prompt to become a player; if the program determines that the person is a player, the program prompting the player to uploading at least one photo of the subject; the customer optionally entering information about the photo; the customer uploading to the program the photo(s); the program assembling the photo(s) into a photobook; the program prompting the player to indicate whether the photo ID is to be expedited or not expedited; if the player indicates expedited, the program prompting the player to enter payment information for the expediting service; the program verifying the payment info to be accepted or not accepted; if the payment is not accepted, the program again prompting the player to enter payment information for the expediting service; if the payment is accepted, the program displaying the disclaimer and prompting the player to accept or not accept a disclaimer; if the player elects not expedited, the program displaying the disclaimer and prompting the player to accept or not accept the disclaimer; if the player rejects the disclaimer, the program rejecting the submission of the photo; if the player accepts the disclaimer, the program publishing the photobook to the photo queue; the program assigning a unique identifier to the photobook, the program making the photobook anonymous by secreting the unique identifier which connects the photobook to the customer; the program making the photobook readable on the photo queue.

If the photo is rejected by the majority of photo identifying players, the program notifying the submitting player that a photo resubmission is required; the player uploading a replacement photo; if the replacement photo is acceptable, the program anonomizing and publishing the photo the ID queue; if the player elects expedited, the program prompting the player to enter payment information; the program providing the player with an image identification or textmatch; and the program proceeding to photo identification and textmatch; if the player does not elect expediting, the program providing the player with an image identification or textmatch; and the program proceeding to photo textmatch.

Photo Textmatch

Referring to FIG. 3, if the photo identifying player is not logged in, the photo identifying player logging in; if the photo identifying player is logged in, the program presenting photobooks to the photo identifying player and the photo identifying player reading photobooks from the photo queue; if no more photos are to be identified, the photo identifying player logging out, or the photo identifying player logging in to read another photo; if more photos are to be identified the photo identifying player determining whether the photos are good; if the photo identifying player determines that the photos are not good, the photo identifying player and program recommending how to improve the photos; the program determining whether the majority of photo identifying layers say that the photos are good; if the majority of photo identifying players say that the photos are not good, the program rejecting the photo with recommendations for technical improvements; if the individual photo identifying player says that the photo is good, the photo identifying players matching the photobook to stored texts identifying or describing the identified subject and the program storing all matches associated to the photobook; the program determining the two leading text matches or names of what is on the subject photo as selected most frequently by the photo identifying players; the program publishing the photobook in combination with the two leading matched texts to the textmatch queue; the program notifying the customer that the match is complete via one of: app notification badge, account notification badge on the program driven website, cell phone text, short message service, apple iMessage, email, postal mail and telefax; the program recording photo identifying player group participation and concurrence in their profiles for statistical analysis; the program determining quality control and reward compensation; the program placing the identified photos in the wild based atlas for website users further discussion and education.

Return Textmatch

Referring to FIG. 4, proceeding from the photo atlas textmatch, the program targeting advertising based on photo identification, associated textmatches, affiliations, account type and geography; the program determining whether to send photos to the wiki based atlas, or in other words storing the photo in a permanent depository; if yes persist photos to wiki photo atlas repository, the program sending a photo to wiki; if no do not persist photos to repository, the program discarding user data from the online database and not conveying to a repository such as wiki based atlas; the program ascertaining whether the website visitor is a professional user; if yes, a professional user, the program ending his or her use of the return result subprogram; if no, not a professional user, the program showing the nonprofessional customer a list of professionals from database of advertisers; prompt the customer to make an appointment with a specialist in the subject matter category for further information or assistance; if the customer makes an appointment, the program determining whether to release the photobook and textmatch based on customer preference; the referral code/info to customer; the program providing a referral code and photobook to the selected professional; if approved by the customer the program adding the clinical findings and lab results to the photobook now residing in the wiki based repository; the program referring the submitter to a community site based on textmatch tags, referral membership; the program ending his or her use of the subprogram.

Quality Control and Compensation

Referring to FIG. 5, data from photo identifying player profiles; the program rating photo identifying players on frequency of participation, concurrence with the majority of photo identifying player votes, number of photograph submissions and referrals, and wiki based atlas text entries; the program compensating the top photo identifying players or affiliates based on their ratings thereby creating an academic competition; the program ending; the program updating photo identifying player profiles with rating/quality control results (concurrence with majority); the photo identifying player viewing quality control and compensation results; the photo identifying player logging out; the program ending his or her use of the subprogram; a photo identifying player in; the photo identifying player viewing quality control and competition reward compensation results; the photo identifying player logs out; the program ending his or her use of the subprogram.

Variation of Method with a Professionals-Only Photo Identifying Player Group

A variation of this method is provided, which is identical to the method described above, with the following exceptions. First, in place of unrestricted lay-public customers as broadly defined above submitting photos for identification and text matching, only credentialed professionals in the subject matter of the game will be provided access to the website/program to submit images. See FIGS. 4-6. The term "professionals" as used here and in the claims is inclusive of but not limited to a degreed or licensed person with acknowledged expertise in a subject matter category, examples of which include an ornithologist, a geologist, a health care professional or a specialized historian. To distinguish the professionals who are provided access to the program to submit images for evaluation by the photo identifying players, that is, as previously noted, professionals on the photo identifying player group, or photo identifying players, or otherwise facilitating the operation of the photo identification program, an accessing professional is referred to in the claims as an photo submitting professional and shall be credentialed accordingly by the program. It is further preferred that the photo submitting professional players may be identified according to those who are invited or referred, and or subsequently credentialed by the website operators and the program to access or join this professionals-only submitting version of the website, such an invitation and credentialing being a method step and the new accessing professional shall identify the photo identifying player who referred him or her in order to reward the photo identifying player. Second, for professional players only, the photo identifying player group members preferably only provide identification of what is on the subject shown in the submitted photo, rather than providing a text match. The term "identification" as used here and in the claims is understood to mean the name of the of the subject photo as identified by a highest number of votes of the photo identifying player group. This is preferred because, when presented with a name of a condition represented on a photo, a photo submitting professional will understand what the name means and what the associated condition is and normally will not require an explanatory text. In addition, submitting professionals are educated in performing associated text searches, unlike the lay public. Applicant does, however, contemplate the option of providing specialized matching text for the submitting professional in addition to the identification of the image of the subject. This specialized matching text preferably originates from the wiki based atlas long term repository constructed in croup sourced manner via the wiki web interface. The emergence of the Internet and the recent developments in online collaborative technologies has provided new tools with which to find, use, share and expand knowledge. Wiki technologies challenge the traditional notions of authorship, editing and publishing and have the inherent potential to change how we construct knowledge repositories and collaborate on the Web. Despite the extraordinary success of Wikipedia and the potential of wiki publishing, its adoption in the academic community and within the field of education has been limited and almost non-existent. Therefore, our wiki based atlas is a novel educational tool.

In contrast to conventional static publications, dynamic publications in the wiki model have no final version, no definite date of publication and continuously integrate and synthesize new findings and insights. We will also develop a dynamic collaborative knowledge base using wiki technology that combines a continuous stream of subject photos and merges it with referenced content created by authors from our credentialed photo identifying player group, with due credit given and rewarded for ongoing revisions and integration of more traditional peer review models into a rigorous educational and research tool.

Our online method will integrate a wiki based atlas into both our professional only and public accessed websites. The wiki based atlas will receive the photographs identified by the photo identifying player group which have been submitted to the website. Professional's only who have credentialed to participate on the Professional Photo Identifying Player Group will be able to access and edit the wiki based atlas such as a wikiphotoatlas text content in order to publish and continuously construct a real time, up to date collaborative knowledge repository on the web. Photo Identifying Player Group members who contribute to the wikiphotoatlas will be rewarded for their efforts and therefore a competition for participation in the education information process will be created.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A method, executed by a computer program stored in a memory and executed by a device, of generating information through interaction and competition among several photo identifying players and with a registered customer or player who has provided at least one photo, comprising the steps of:
    providing a device with a memory containing the computer program;
    registering using the device to become a player thereby entering the competition of photo submission and photo content identification;
    providing the device with a subject matter category for a photo;
    providing a plurality of photo identifying players;
    accessing the program using the device;
    becoming a player by using the device to gain access to the program and subscribing to a textmatch queue;
    generating at least one photo of a subject within the subject matter category;
    uploading the at least one photo to the device;
    making the at least one photo available for viewing using the device;
    retrieving the at least one photo from the memory using the device;
    viewing the at least one photo using the device and identifying what is shown in the photo;
    matching the subject shown in the at least one photo using the device to one subject identification;
    creating a competition amongst the players using the device by rating the players according to at least one factor comprising that of the frequency of concurrence with majority of the players who participate in a particular photo identifying player task of identifying photos or images;
    updating the collection through operating of the program by using the device with the two leading matched texts associated with the photo names most selected by the several players and publishing to the textmatch queue;
    notifying the photosubmitting player through operation of the program by the device that the identification is complete and is available;
    and accessing the program by using the device and displaying the at least one identification.

2. A method, executed by a computer program stored in a memory and executed by a device, of generating information through interaction among several players identifying photos and with a player who has provided at least one photo, comprising the steps of:
    providing the computer program;
    providing the program with a subject matter category related to the photo by using the device;
    providing the prospective players with options of either presenting his or her qualifications for evaluation through operation of the program by using the device and taking a subject matter competency test;
    entering by using the device a player decision of whether to enter his or her qualifications or to take the subject matter competency test;
    one of: entering by using the device a player qualifications and credentials for becoming a player for evaluation, and taking through operating the device a subject matter competency test administered by the program;
    one of evaluating the qualifications of the prospective player and determining whether the prospective player passed the subject matter competency test and thereby either accepting or rejecting the prospective player for membership in the photo identifying game and thereby providing a plurality of photo identifying players;
    accessing the program using the device;
    becoming a player by using the device to gain access to the program and automatically being subscribed to a textmatch queue;
    generating at least one photo of a subject within the subject matter category;
    uploading the at least one photo to the program using the device;
    making the at least one photo available for viewing using the device;
    retrieving the at least one photo using the device;
    viewing the at least one photo using the device and identifying what is shown in the photo;
    matching the subject shown in the at least one photo to one stored subject identification using the device;
    updating the collection through operating the program using the device with the two leading matched texts associated with the photo names most selected by the several players and publishing to the textmatch queue;
    notifying the photo submitting player that the identification is complete and is available;
    accessing the program by using the device and displaying the at least one identification;
    and creating a competition amongst the players by rating the accepted players according to at least one factor including the frequency of concurrence with majority of the players who participate in a particular photo identifying player task of identifying photos or images, and at least one of: the frequency of participation, the number of photos if any that a player submits, the number of photos if any that a player identifies, the concurrence of the players with the majority when identifying photos and the number of referenced text contributions the player writes in the repository for the education of the website or mobile app users.

3. The method of claim 2, comprising the additional step of: rewarding through operation of the program by the device a certain number of the highest rated players selected according to the rating process.

4. The method of claim 2, wherein the program is accessed through a search website, and wherein the professional submitting a photo is a player identifying photos, earns program credits toward photo identifying player participation rewards, and one of recognition and citation on a professionals-only community and competition associated with this search website.

5. The method of claim 1, wherein the identification is a name of the subject shown in the at least one photo.

6. The method of claim 1, wherein the identification is a description of the subject shown in the at least one photo.

7. The method of claim 1, additionally comprising the step of entering information using the device relating to the at least one photo and related information from the player.

8. The method of claim 1, additionally comprising the step of making the at least one photo anonymous using the device.

9. The method of claim 1, wherein the several players each additionally match the at least one photo using the device to a preferred associated text stored in the program identifying and describing what is shown in the at least one photo.

10. A method, executed by a computer program stored in a memory and executed by a device, of generating information through interaction among several photo identifying players and with a nonplaying customer who has provided at least one photo, comprising the steps of:
   providing a device with a memory containing the computer program;
   providing the device with a subject matter category;
   providing a plurality of photo identifying players;
   accessing the program using the device;
   becoming a nonplaying member by using the device to gain access to the program and subscribing to a photo-textmatch queue;
   generating at least one photo of a subject within the subject matter category;
   uploading the at least one photo to the device;
   entering information using the device relating to at least one photo and related information from the customer;
   making the collection anonymous using the device;
   making the photo collection available for viewing in the photo queue;
   retrieving the photo collection from the photo queue using the device;
   viewing the collection using the device and identifying what is shown in the photo;
   matching at least one photo using the device to two preferred names and associated texts stored in the program identifying and describing what is shown in the at least one photo in the collection;
   determining the two leading photo text matches selected most frequently by the several players for the collection using the device;
   creating a competition amongst the players using the device by rating the players according to at least one factor comprising that of the frequency of concurrence with majority of the players who participate in a particular photo identifying player task of identifying photos or images;
   updating the identified photo collection through operation of the program by using the device with the two leading matched texts most selected by the several players and publishing it to the photo textmatch queue;
   notifying the customer through operation of the program by using the device that the photo identification is complete and the updated collection with identified photo and matched texts is available;
   and accessing the program by using the device and displaying the updated identified photo collection and matched texts from the photo textmatch queue.

11. A method executed by a computer program stored in a memory and executed by a device of providing information executed by a computer program interacting with at least one photo identifying player and with a customer who has provided the photo of a subject within a subject matter category, comprising the steps of:
   providing a device with a memory containing the computer program;
   accessing the program using the device;
   displaying a disclaimer using the device;
   displaying a notice of privacy practices using the device;
   entering a decision using the device of whether he or she accepts the disclaimer;
   if the customer rejects the disclaimer, rejecting the customer using the device and ending his or her program use;
   if the customer accepts the disclaimer, becoming a member and gaining access to the program using the device by entering a registration authorization and completing a customer profile including the customer address;
   entering credit card charging information using the device to pay for expedited use of the program;
   verifying using the device whether the credit card charging is authorized;
   automatically subscribing to a photo identification textmatch queue using the device;
   one of generating and acquiring using the device at least one photo referred to as a subject photo;
   uploading using the device at least one photo to the program;
   entering additional information using the device about the subject depicted in the at least one photo;
   publishing a collection of at least one subject photo using the device to the photo queue;
   assigning a unique identifier using the device to the collection and indirectly relating the identifier to the submitting user;
   making the collection anonymous using the device by secreting the relationships between unique collection identifier and the submitting user;
   making the collection readable on the photo queue using the device;
   providing a plurality of photo evaluating players;
   retrieving using the device the at least one photo from the queue;
   determining using the device whether the at least one photo and history provided by the customer contains sufficient information to interpret and identify a the photo;

viewing using the device the at least one photo and identifying the what is shown in the at least one photo;

matching using the device what is identified from the at least one photo to two most preferred stored texts doing one of identifying and describing the at least one photo;

determining using the device the two leading text matches associated with the names to identify the photo selected most frequently by the several photo identifying players;

storing using the device all identifications and text matches associated to the collection;

determining using the device the two leading text matches or names of what is the photo as selected most frequently by the photo identifying players;

creating a competition amongst the players using the device by rating the players according to at least one factor comprising that of the frequency of concurrence with majority of the players who participate in a particular photo identifying player task of identifying photos or images;

publishing using the device the identified photo collection in combination with the two leading matched texts to a textmatch queue;

returning the textmatch using the device;

and displaying using the device the identified image in combination with the matched texts to the customer.

12. The method of claim 10, wherein the customer registration authorization and history is in the form of a personal profile and historic information form.

13. The method of claim 10, comprising the additional steps of:

facilitating using the device moderated user discussion about specific collections between at least two of lay website visitors which are one of a lay customer and a credentialed professional player;

providing using the device discussion prompts associated to collections in the form of buttons in close proximity to collection presentation;

creating using the device a discussion thread if a player selects the discussion prompt and no discussion has been created regarding the collection photobook;

adding using the device the contributions of a player to the discussion if a discussion thread has been created regarding the collection;

and providing using the device for oversight of discussion by a moderator to ensure quality content of discussion thread.

14. The method of claim 10, comprising the additional step of: a providing credentials using the device.

15. The method of claim 10, comprising the additional step of: a taking an online competency examination using the device.

16. The method of claim 10, comprising the additional step of: billing using the device the non-playing photo submitting customer for the matched texts if the photo text matching is done on an expedited basis.

17. The method of claim 10, comprising the additional step of billing using the device the nonplaying photo submitting customer for the matched texts if the matching is done on an expedited basis.

18. The method of claim 10, wherein each of the photo identifying players select a first preferred matched name and associated text and a second preferred matched text.

19. The method of claim 7, comprising the additional step of categorizing using the device as a statistically first preferred matched text and a statistically preferred second matched text by selected players the published two leading photo names and associated matched texts.

20. The method of claim 10, comprising the additional step of selecting professionals using the device for participation as photo identifying players.

21. The method of claim 20, comprising the additional steps of:

accessing the program using the device as a prospective player;

becoming a member using the device;

using the device the prospective photo identifying player with options of either presenting his or her qualifications for evaluation and taking a subject matter competency test;

entering using the device his or her decision of whether to enter his or her qualifications or to take the subject matter competency test;

one of: entering using the device the prospective photo identifying player qualifications and credentials for becoming a player for evaluation, and taking a subject matter competency test administered by the program;

one of evaluating the qualifications of the prospective player and determining whether the prospective player passed the subject matter competency test using the device and thereby either accepting or rejecting the prospective player for membership in the game of identifying photos and editing text for the wiki;

if the prospective player is rejected, ending the interaction of the perspective player using the device;

if the prospective player is accepted to become a player, creating using the device a profile of the accepted player with account and reimbursement information;

providing using the device a photo queue;

automatically subscribing using the device the accepted player to the photo queue;

retrieving using the device the photo collection from the queue;

viewing using the device the photo collection and identifying what is shown in the at least one photo;

matching using the device the identified collection to stored texts identifying or describing the identified photo;

storing using the device all identifications and text matches associated to the collection;

and determining using the device the two leading text matches or names of the subject shown in the photo as selected most frequently by the players.

22. The method of claim 21, wherein the photo identifying players collectively constitute a photo identifying group.

23. The method of claim 22, comprising the additional steps of creating a competition among photo identifying player participants:

further rating using the device the accepted professional players on a periodic basis according to at least one of: the frequency of participation identification regarding the top two image text matches, the number of photos if any that a player submits, the number of photos if any that a photo identifying player identifies the concurrence of the photo identifying player with the majority of other players when identifying photos and the number of referenced text contributions the player writes in the repository for the education of the website and mobile app users;

rewarding using the device a certain number of the highest rated players selected according to the rating process.

24. The method of claim 23, wherein the periodic basis on which doctors and associated health care professional players who were credentialed to play are rated and rewarded is one of: daily, weekly, biweekly and monthly.

25. A method of providing information executed by a computer program stored in a memory and executed by a device, interacting with a group of players and with a customer who provides a photo of a subject within a subject matter category, comprising the steps of:
   providing a plurality of players;
   accessing using the device the program on a computer;
   becoming a member using the device of text match service to gain further access to the program;
   automatically subscribing the customer to a photo text-match queue;
   providing information using the device relating to the submitted photo;
   uploading to the program using the device the at least one photo;
   assembling the at least one photo and information using the device into a collection;
   publishing using the device the collection to a photo queue;
   assigning using the device a unique identifier to the collection;
   making the collection anonymous using the device by secreting the unique identifier which connects the collection to the customer;
   making the collection readable on the photo queue using the device;
   retrieving using the device the collection from the queue;
   viewing using the device the collection and identifying what is shown in the at least one photo;
   matching using the device the identified collection to stored texts identifying or describing the subject shown in the photo;
   storing using the device all photo identifications and text matches associated to the collection;
   determining using the device the two leading textmatches or names of what is shown in the photo as selected most frequently by the players;
   creating a competition amongst the players using the device by rating the players according to at least one factor comprising that of the frequency of concurrence with majority of the players who participate in a particular photo identifying player task of identifying photos or images;
   publishing using the device the identified photo collection in combination with the two leading matched texts to the textmatch queue;
   providing using the device a return photo textmatch;
   and notifying using the device the customer that the match is complete.

26. A method executed by a computer program stored in a memory and executed by a device of providing information executed by a computer program interacting with a group of professional players and with a nonplaying customer who provides the photo of a subject within a subject matter category, comprising the steps of:
   providing a device with a memory containing the computer program;
   providing a plurality of players;
   accessing the program using the device;
   becoming using the device a member of text match service to gain further access to the program;
   displaying a disclaimer using the device;
   displaying using the device a notice of privacy practices;
   entering using the device a decision of whether he or she accepts the disclaimer;
   if the customer rejects the disclaimer, rejecting using the device the customer and ending his or her program use;
   if the customer accepts the disclaimer, deciding whether the customer wishes to pay for expedited service;
   if the customer decides for expedited service, collecting using the device payment information and charging the customer for expedited service;
   supplying information using the device about subject of the at least one photo in the photo queue;
   displaying using the device a tutorial guiding the user to generate or acquire a photo of the concern for uploading;
   one of generating and acquiring using the device at least one photo of a subject;
   uploading using the device to the program at least one photo;
   assembling using the device at least one photo into a collection;
   publishing using the device the collection to the photo queue;
   assigning using the device a unique identifier to the collection, the program making the collection anonymous by secreting the unique identifier which connects the collection to the customer;
   making the collection readable on the photo queue using the device;
   retrieving using the device the collection from the queue;
   viewing the collection using the device and identifying what is shown in the at least one photo;
   matching the identified collection using the device to stored texts identifying and describing the subject shown in the photo;
   storing using the device all identifications and text matches associated to the collection;
   determining using the device the two leading text matches or names of what publishing using the device the collection in combination with the two leading matched texts to the textmatch queue;
   creating a competition amongst the players using the device by rating the players according to at least one factor comprising that of the frequency of concurrence with majority of the players who participate in a particular photo identifying player task of identifying photos or images;
   notifying the customer using the device that the identification and text match is complete;
   viewing the identifications and textmatches associated to the customer collection from the textmatch queue;
   billing the customer using the device for expedited use of the program;
   and displaying using the device the identified image in combination with the matched text to the nonplaying customer.

27. A method of providing information executed by a computer program stored in a memory and executed by a device, interacting with several players and with an image submitting providing the photo of a subject within a subject matter category, comprising the steps of:
   providing a plurality of players;
   one of generating and acquiring at least one photo of one a subject within a subject matter category;
   accessing using the device the program on a computer;
   uploading to the program the image using the device;
   providing using the device information relating to the subject in the photo;

publishing the photo using the device;
queuing the photo using the device for viewing by the players;
retrieving the photo from the queue using the device;
viewing the photo using the device and each of a plurality of players identifying what is shown in the photo;
determining using the device the leading photo identification selected most frequently by the photo identifying players;
creating a competition amongst the players using the device by rating the players according to at least one factor comprising that of the frequency of concurrence with majority of the players who participate in a particular photo identifying player task of identifying photos or images;
and displaying using the device the photo identification.

28. The method of claim 27, wherein the players are professional players, comprising the additional step of providing using the device credentials in order to subscribe and qualify to submit to the photo identification search engine and game.

29. The method of claim 27, comprising the additional step of determining using the device that the photo submitting professional qualifies to join the game and submit a photo to the professional-only photo submission program and participate in the photo identification competition.

30. A method executed by a computer program stored in a memory and executed by a device of providing information executed by a computer program interacting with several photo identifying players comprising several professionals and with a nonplaying photo submitting professional who has provided the photo of a subject within a subject matter category, comprising the steps of:
providing a device with a memory containing the computer program;
providing a plurality of photo identifying players;
one of generating and acquiring using the device at least one photo of a subject within a subject matter category;
accessing the program using the device;
displaying a disclaimer using the device;
displaying a notice of privacy practices using the device;
entering a decision using the device whether he or she accepts the disclaimer;
if the photo submitting professional rejects the disclaimer, rejecting using the device the photo submitting professional and ending his or her program use; if the photo submitting professional accepts the disclaimer;
subscribing using the device to the text match service to gain access to the program by entering a registration authorization and implementing a photo submitting professional profile including the photo submitting professional electronic address;
uploading the photo to the program using the device;
providing information using the device about the subject of the photo;
the at least one photo using the device into a collection of photos and any related data;
publishing the collection to the photo queue using the device;
entering using the device credit card charging information to pay for use of the program, should an expedited identification be desired;
verifying using the device whether the credit card charging is authorized;
assigning using the device a unique identifier to the collection;
making the collection anonymous using the device by secreting the unique identifier;
queuing the photo for viewing by the players using the device;
retrieving the submitted photo from the photo queue using the device;
determining using the device whether the photo and information provided by the photo submitting professional contains sufficient information to interpret and identify the photo;
viewing the photo using the device and identifying what is shown in the photo;
determining using the device the two leading text matches or names of what is as selected most frequently by the photo identifying players;
creating a competition amongst the players using the device by rating the players according to at least one factor comprising that of the frequency of concurrence with majority of the players who participate in a particular photo identifying player task of identifying photos or images;
publishing using the device the identified photo collection in combination with the two leading matched texts to the textmatch queue;
notifying using the device the photo submitting professional that the identification and text match is complete;
and viewing using the device the photo identifications and textmatches associated to their collection from the textmatch queue.

31. The method of claim 30, wherein each identification is a name associated with the subject matter category.

32. The method of claim 31, wherein each identification is a name associated with the subject matter category.

33. The method of claim 30, comprising the additional step of:
inviting the photo submitting professional to access the computer program, while denying non-credentialed professionals access to the computer program.

34. The method of claim 27 in which the two leading photo identifications selected most frequently by identifying players is determined using the device, and these two leading photo identifications are published using the device in combination with the two leading identifying names most selected by the plurality of photo identifying players to one of a receiving device and a location, and these two leading photo identifications are displayed using the device.

35. The method of claim 27, subscribing using the device to the text photo match identification service to gain access to the program;
making the photo anonymous using the device;
publishing using the device the photo in combination with the leading identifying name most selected by the plurality of photo identifying players to one of a receiving device and location;
and notifying using the device the photo submitting professional player that the match is complete and the matched image identifications are available.

36. A method executed by a computer program stored in a memory and executed by a device of providing information executed by a computer program interacting with several photo identifying players and with a photo submitting professional player who provides the photo of a subject within a subject matter category, comprising the steps of:
providing a device with a memory containing the computer program;
providing a plurality of photo identifying players;

one of generating and acquiring at least one photo of a subject within a subject matter category;
accessing the program using the device;
becoming a member of the photo identification and text-match service using the device to gain further access to the text match service to gain access to the program by entering a registration authorization and completing a photo submitting professional player profile;
uploading using the device one or more at least one photo to the program;
entering information using the device about the subject shown in the photo;
assembling using the device the at least one photo into a collection;
publishing the collection to a photo queue using the device;
assigning a unique identifier to the collection using the device;
making the collection anonymous using the device by secreting the unique identifier which connects the collection to the customer;
making the collection readable on the photo queue for participating photo identifying players viewing the collection using the device;
viewing the collection from the photomatch queue using the device;
determining using the device whether the photo and history provided by the photo submitting professional player contains sufficient information and data to interpret and identify what is represented in the collection;
viewing the at least one photo using the device and identifying what is shown in the collection;
determining using the device the two leading identifications made most frequently by the participating photo identifying players;
creating a competition amongst the players using the device by rating the players according to at least one factor comprising that of the frequency of concurrence with majority of the players who participate in a particular photo identifying player task of identifying photos or images;
publishing the collection in combination with the two leading matched texts to the textmatch queue using the device;
notifying using the device the professional photo submitting player that the identification and textmatch is complete the program displaying the photo in combination with the identifications to the photo submitting professional player;
and viewing using the device the identifications and textmatches associated to their collection from the photo textmatch queue.

37. The method of claim 36, comprising the additional steps of:
displaying a disclaimer using the device;
displaying a notice of privacy practices using the device;
entering a decision using the device of whether he or she accepts the disclaimer;
if the submitting professional player rejects the disclaimer, rejecting the photo submitting professional using the device and ending his or her program use;
and if the photo submitting professional player accepts the disclaimer, admitting the professional using the device and permitting access to the program to submit photos for interpretation.

38. The method of claim 37, comprising the additional steps of:
entering credit card charging information using the device to pay for use of the program for a photo-identification which is expedited;
and verifying using the device whether the credit card charging is authorized.

39. A method of interacting with a photo text match program stored in a memory and executed by a device, comprising the steps of:
accessing the program using the device;
requesting membership using the device;
displaying user terms and conditions and a disclaimer using the device;
entering a decision using the device of whether he or she accepts the terms and conditions and disclaimer;
if the visitor rejects the terms and conditions and disclaimer, rejecting the visitor using the device and ending his or her use of the program;
if the visitor accepts the terms and conditions and disclaimer, displaying a notice of privacy practices using the device;
entering a decision using the device of whether he or she accepts the notice of privacy practices;
if the visitor rejects the notice of privacy practices, the program rejecting the visitor and ending his or her use of the program;
if the visitor accepts the notice of privacy practices, prompting the visitor using the device to indicate whether he or she is a professional or a non-professional customer;
if the visitor indicates non-professional customer, prompting using the device the customer to enter registration authorization on one of a personal history and photo history form;
entering the registration authorization using the device and signing the personal history or photo history form;
accepting one of the signed personal history and photo history form using the device;
creating a customer profile using the device;
for nonprofessionals to participate if the visitor indicates that he or she is a professional, prompting the professional to enter his or her credentials using the device in order to participate in the game of photo text matching and wiki editing;
verifying the credentials to either accept or reject the credentials using the device;
if the program accepts the credentials, prompting the professional using the device to one of submit a photo only and become a photo identifying player;
if the professional indicates his or her decision to submit a photo only and not play the game, creating a professional submitted profile using the device;
if the professional indicates his or her decision to become a game playing member, administering using the device a photo identification test comprised of presenting a number of control photos known to depict specific conditions and recording the candidates answers identifying the photos;
if the professional passes the photo identification test, creating a photo identifying player profile using the device and marking the professional as a photo identifying player who may identify photos to compete for prizes.

40. A method of interacting with a photo text match program, comprising the steps of:
accessing the program;

prompting the website visitor using the device to submit identifying information to determine whether the website visitor is a member;
if the program determines that the website visitor is not a member, directing the website visitor using the device to a prompt to become a member;
if the program determines that the website visitor is a member, prompting the member using the device to identify a subject matter category;
the playing or nonplaying member subscribing to the textmatch to receive text matches from the group;
uploading at least one photo of a subject within the subject matter category using the device;
entering information about the subject shown in the photo using the device;
uploading to the program using the device the at least one photo;
assembling the at least one photo into a photobook collection of at least one photo and related data using the device;
publishing the collection using the device to the photo queue;
assigning a unique identifier to the collection using the device;
making the collection anonymous using the device by secreting the unique identifier which connects the collection to the customer;
retrieving the collection from the queue using the device;
viewing the collection using the device and identifying what is shown in the at least one photo;
determining using the device if the collection contains identifiable data in the at least one photo, and if not rejecting the collection with a recommendation for improvement;
matching the collection using the device to stored texts identifying the identified at least one photo;
storing all rejections identifications using the device and text matches associated to the collection;
determining using the device whether one of a majority of professional players and a predetermined percentage of professional players rejected the at least one photo and if so marking the photobook collection as unusable with top recommendation for improvement;
determining the two leading text matches or names of what is in the photo selected most frequently by the photo identifying players;
creating a competition amongst the players using the device by rating the players according to at least one factor comprising that of the frequency of concurrence with majority of the players who participate in a particular photo identifying player task of identifying photos or images;
and publishing the collection in combination with the two leading matched texts or rejection notice with recommendations for improvement to a textmatch queue.

41. The method of claim 40, additionally comprising the steps of:
prompting using the device the nonplaying photo submitting member to indicate whether the photo identification is to be expedited or not expedited;
if the member indicates expedited, prompting the member using the device to enter payment information for the expediting service;
verifying using the device the payment info to be accepted or not accepted;
if the payment is not accepted, again prompting the nonplaying photo submitting member using the device to enter payment information for the expedited service;
if the payment is accepted, displaying the disclaimer using the device and prompting the nonplaying photo submitting member to accept or not accept a disclaimer;
and if the nonplaying photo submitting member elects not expedited, displaying using the device the disclaimer and prompting the member to accept or not accept the disclaimer;
if the photo submitting nonplaying member elects expedited, prompting the member using the device to enter payment information;
providing using the device the nonplaying member with one of a photo identification and a textmatch;
proceeding to photo textmatch using the device;
if the member does not elect expediting, providing the member using the device with one of an image identification and a textmatch;
and proceeding using the device to the photo textmatch.

42. A method of interacting with a photo text match program stored in a memory and executed by a device, comprising the steps of:
accessing the program using the device;
logging in using the device;
detecting and alerting the photo identifying player using the device as to whether he or she is logged in and notifying the photo submitting website visitor;
if the photo identifying player is not logged in, logging in using the device;
if the photo identifying player is logged in, presenting photos to and the photo identifying player reading photos from the identification queue using the device;
if no more photos are to be identified, togging out using the device, or the photo identifying player logging in using the device to read another photo;
if more photos are to be identified, determining whether the photos are of sufficient quality for evaluation using the device;
if the photo identifying player determines that the photos are not of sufficient quality for evaluation, recommending using the device how to improve the photos;
determining using the device whether the majority of photo identifying players say that the photos are of sufficient quality for evaluation;
if the majority of players say that the photos are not of sufficient quality for evaluation, rejecting the photo using the device;
if the majority of photo identifying players say that the photo is not good, notifying the nonplaying photo submitting customer using the device that the photo is not good and recommending resubmission with photographic technique improvements, if the photo identifying player determines that the photos are good, identifying the photo using the device;
logging out using the device;
recording the top two identifications from the photo identifying players using the device;
publishing the top two identifications to match queue using the device;
creating a competition amongst the players using the device by rating the players according to at least one factor comprising that of the frequency of concurrence with majority of the players who participate in a particular photo identifying player task of identifying photos or images;

notifying the nonplaying photo submitting customer using the device of the top two identifications published such as via email, social network, or texting; returning to text match;

and recording photo identifying using the device player participation in their player profiles.

43. The method of claim 41, additionally comprising the step of matching the identified photos to the top two text matches using the device.

44. The method of claim 42, wherein the two identifications are published through at least one of: email, a social network and texting.

45. The method of claim 44, additionally comprising the steps of:

proceeding from the photo textmatch, targeting advertising using the device based on key words in the photo identification and textmatch, affiliations, account type and geography;

determining using the device whether to deliver the photos into a permanent depository such as a wiki based skin atlas;

if yes, persisting photos to repository, writing the collection to a persistent repository using the device;

if no, not persisting photos to repository, not conveying the collection the persistent repository;

ascertaining using the device whether the website visitor is a professional user;

and if no, not a professional user, showing the nonprofessional customer using the device a list of professionals from a database of advertisers.

46. The method of claim 45, additionally comprising the steps of:

proceeding from participation record queue statistics aggregating data from photo identifying player profiles using the device;

rating photo identifying players using the device;

rewarding the top photo identifying players or affiliates using the device based on their ratings;

ending his or her use of the program using the device;

updating player profiles using the device with his or her rating and quality control results;

viewing the quality control and compensation results using the device;

logging out using the device;

ending his or her use of the program using the device;

logging in using the device;

viewing quality control and reward results using the device;

logging out using the device;

and ending his or her use of the program.

47. The method of claim 1, additionally comprising the step of:

placing the identified photos into a data repository using the device for and for the continuing education of the users of the program.

48. The method of claim 1, wherein the program notifies the nonplaying photo submitting customer that the photo text match is complete through one of: an app notification badge, an account notification badge on the program driven website, cell phone text, a short message service, APPLE IMESSAGE, email, social network, postal mail and telefax.

49. The method of claim 42, wherein the permanent depository into which the program determines whether to deliver the photos is a wiki based skin atlas.

50. The method of claim 43, wherein the photo identifying players are rated on participation, photo submissions, and referenced wiki based skin atlas entries.

51. The method of claim 1, wherein the collection into which the program assembles at least one photo is a photobook.

52. The method of claim 10, comprising the additional step of:

providing the nonplaying nonprofessional customer with a pseudo random collection appointment code using the device;

providing names and contact information of physicians practicing medicine in the geographic proximity of the customer using the device for use by the customer to one of expedite and facilitate an appointment, and thereby visiting and establish a physician-patient relationship with a practicing physician;

allowing the practicing physician access to the collection on the textmatch queue using the appointment code provided to the referred customer using the device.

53. The method of claim 11, comprising the additional step of:

advertising at least one of a local doctor, therapist, and facility in the geographical area of the customer using the device, based on customer address provided as part of the customer profile information.

54. The method of claim 12, comprising the additional step of:

displaying advertisements using the device, which each advertising is selected based on tags or text labels associated to the advertisement in order to target the needs of the customer.

55. The method of claim 9, wherein the advertisements are for one of:

drugs, doctors, hospitals, clinics, therapists and non-prescribed products regardless of whether related to the image text matches.

56. The method of claim 2, comprising the additional step of:

displaying using the device one of a tutorial and a how-to guide which is specific to the body region containing the area of the photo to the customer;

prompting using the device the user to select the body region using standard figures or equivalent graphic representation of the body;

responding using the device to the user selection with sub drawings as needed to property identify the region; and the program displaying the user's choice of one of written and video how to guide specific to the region.

57. The method of claim 25, comprising the additional steps of:

providing the customer with the collection identifier using the device to be used by them as an appointment code and contact information to one of facilitate and expedite an appointment with a physician practicing medicine in a geographic location in proximity to one of the image-submitting customer, and in a location or institution or clinic preferred by the user;

and facilitating access to the collection by the healthcare professional using the device to whom the customer was referred using the appointment code to directly view the collection.

58. The method of claim 41, additionally comprising the steps of:

prompting the customer to make an appointment and establish a physician-patient relationship with a practicing physician;

if the customer makes an appointment, making the collection available to the physician through the use of the six digit collection identifier which will also act as appointment code using the device;

providing a geographically preferred physician with one of an appointment referral code and info to obtain the photographic information and text match pertinent to the customer using the device;

providing a referral code and collection to the selected professional using the device;

requesting one of lab results and findings from the referred professional after the dermatology professional has, taken a history, performed a physical examination, diagnosed and treated and therefore established a physician-patient relationship with the customer using the device;

adding one of the lab results and findings to the collection using the device to enhance the content of the text match and associated wiki based skin atlas;

referring the submitter to a community site using the device based on textmatch tags, refer membership;

and ending his or her use of the program using the device.

59. The method of claim 1, 2 or 10, wherein the subject matter category is what is shown on one of skin, hair, nails and mucosa.

60. The method of claim 59, comprising the additional step of prompting the nonprofessional photo submitting website or mobile app photo submitter to make an appointment with a medical professional using the device.

61. The method of claim 1, comprising the additional steps of:
creating a competition amongst players using the device by rating the accepted players according to at least one of: the frequency of participation, the number of photos if any that a player submits, the number of photos if any that a player identifies, the concurrence of the players with the majority when identifying photos and the number of referenced text contributions the player writes in the repository for the education of the website or mobile app users;

and rewarding a certain number of the highest rated players selected according to the rating process using the device.

62. The method of claim 5, additionally comprising the step of:
placing the identified photos into a data repository using the device for and for the continuing education of the users of the program.

63. The method of claim 6, additionally comprising the step of:
placing the identified photos into a data repository using the device for and for the continuing education of the users of the program.

64. The method of claim 12, additionally comprising the step of:
placing the identified photos into a data repository using the device for and for the continuing education of the users of the program.

65. The method of claim 23, additionally comprising the step of:
placing the identified photos into a data repository using the device for and for the continuing education of the users of the program.

66. The method of claim 25, additionally comprising the step of:
placing the identified photos into a data repository using the device for and for the continuing education of the users of the program.

67. The method of claim 26, additionally comprising the step of:
placing the identified photos into a data repository using the device for and for the continuing education of the users of the program.

68. The method of claim 29, additionally comprising the step of:
placing the identified photos into a data repository using the device for and for the continuing education of the users of the program.

69. The method of claim 41, additionally comprising the step of:
placing the identified photos into a data repository using the device for and for the continuing education of the users of the program.

70. The method of claim 22, wherein the program notifies the nonplaying photo submitting customer that the photo text match is complete through one of: an app notification badge, an account notification badge on the program driven website, cell phone text, a short message service, APPLE IMESSAGE, email, social network, postal mail and telefax.

71. The method of claim 24, wherein the program notifies the nonplaying photo submitting customer that the photo text match is complete through one of: an app notification badge, an account notification badge on the program driven website, cell phone text, a short message service, APPLE IMESSAGE, email, social network, postal mail and telefax.

72. The method of claim 28, wherein the program notifies the nonplaying photo submitting customer that the photo text match is complete through one of: an app notification badge, an account notification badge on the program driven website, cell phone text, a short message service, APPLE IMESSAGE, email, social network, postal mail and telefax.

73. The method of claim 34, wherein the program notifies the nonplaying photo submitting customer that the photo text match is complete through one of: an app notification badge, an account notification badge on the program driven website, cell phone text, a short message service, APPLE IMESSAGE, email, social network, postal mail and telefax.

74. The method of claim 40, wherein the program notifies the nonplaying photo submitting customer that the photo text match is complete through one of: an app notification badge, an account notification badge on the program driven website, cell phone text, a short message service, APPLE IMESSAGE, email, social network, postal mail and telefax.

75. The method of claim 5, wherein the collection into which the program assembles at least one photo is a photobook.

76. The method of claim 6, wherein the collection into which the program assembles at least one photo is a photobook.

77. The method of claim 12, wherein the collection into which the program assembles at least one photo is a photobook.

78. The method of claim 23, wherein the collection into which the program assembles at least one photo is a photobook.

79. The method of claim 25, wherein the collection into which the program assembles at least one photo is a photobook.

80. The method of claim 29, wherein the collection into which the program assembles at least one photo is a photobook.

81. The method of claim 34, wherein the collection into which the program assembles at least one photo is a photobook.

* * * * *